(12) United States Patent
Yan et al.

(10) Patent No.: US 11,436,093 B2
(45) Date of Patent: Sep. 6, 2022

(54) METHOD, ELECTRONIC DEVICE, AND COMPUTER PROGRAM PRODUCT FOR BACKING UP DATA

(71) Applicant: EMC IP Holding Company LLC, Hopkinton, MA (US)

(72) Inventors: Jin Ru Yan, Shanghai (CN); Mengze Liao, Shanghai (CN); Qi Wang, Shanghai (CN); Weiyang Liu, Shanghai (CN); Jing Yu, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/865,818

(22) Filed: May 4, 2020

(65) Prior Publication Data

US 2021/0248041 A1    Aug. 12, 2021

(30) Foreign Application Priority Data

Feb. 7, 2020    (CN) ......................... 202010082397.9

(51) Int. Cl.
*G06F 11/14*    (2006.01)
(52) U.S. Cl.
CPC .... *G06F 11/1461* (2013.01); *G06F 2201/805* (2013.01)
(58) Field of Classification Search
CPC .................. G06F 11/1461; G06F 2201/805
USPC ......................................................... 707/654
See application file for complete search history.

(56) References Cited

U.S. PATENT DOCUMENTS

| 2002/0147733 | A1* | 10/2002 | Gold | G06F 11/1448 |
| 2011/0208933 | A1* | 8/2011 | Selfin | G06F 11/1441 |
| | | | | 711/162 |
| 2016/0335011 | A1* | 11/2016 | Lee | G06F 3/0647 |

* cited by examiner

*Primary Examiner* — Yair Leibovich
(74) *Attorney, Agent, or Firm* — Womble Bond Dickinson (US) LLP

(57) ABSTRACT

Embodiments of the present disclosure relate to a method, an electronic device, and a computer program product for backing up data. The method comprises: determining historical information of a storage space for backing up the data, the historical information indicating a historical size of the storage space configured to store the data within a historical time period, a size of the data being changeable within the historical time period; determining change information of the historical size of the storage space based on the historical information; determining, based on the change information, a probability that a size of the storage space to be configured to back up the data reaches a predetermined size; and adjusting, based on a determination that the probability is higher than or equal to a predetermined threshold, a backup policy for backing up the data to reduce the probability. By using the technical solution of the present disclosure, a backup system can pre-adjust a backup policy by determining a change trend of use of a storage space for backing up data, so that a backup failure will not be caused by an insufficient storage space, and an original backup policy can be recovered automatically when a size of the storage space is increased.

18 Claims, 4 Drawing Sheets

FIGURES

METHOD, ELECTRONIC DEVICE, AND COMPUTER PROGRAM PRODUCT FOR BACKING UP DATA

CROSS-REFERENCE TO RELATED APPLICATION

This patent application claims priority, under 35 U.S.C. § 119, of Chinese Patent Application No. 202010082397.9, filed Feb. 7, 2020, which is incorporated by reference herein in its entirety.

TECHNICAL FIELD

Embodiments of the present disclosure generally relate to the field of data protection, and specifically to a method, an electronic device, and a computer program product for backing up data.

BACKGROUND

A data protection product mainly protects stored data of a user by backup, so that when the data of the user is unavailable due to a hardware or software problem, the stored data of the user can be recovered based on previously generated backup data. The user needs to configure a backup policy so as to protect the data by backup. The backup policy includes a recovery point objective (RPO) for the stored data and retention time of the backup data generated for the stored data. The recovery point objective corresponds to a frequency of performing a backup operation on the stored data in a backup window. The backup window is a time period allowing data backup, and the retention time refers to a duration in which the backup data will be retained by a backup system. It can be understood that the smaller the recovery point objective is, the longer the retention time is, and then the more the storage space will be required to store the backup data, where the smaller is the recovery point objective, the higher the backup frequency is.

A storage space required for backing up the stored data is usually calculated based on a size of user data and a selected backup policy, and then pre-allocated to a user. A larger storage space corresponds to a greater cost and overhead, and therefore, the user will tend to choose a storage space with an appropriate size. However, the size of the user data will frequently change in applications of the data protection product, where the size will often become larger due to addition of a new content. In this case, continuing backup of the stored data based on a fixed backup policy will result in reduction of a remaining space of the storage space, and ultimately result in a situation that the storage space is not enough to store new backup data, thus resulting in a backup failure. As a result, the user data may not be effectively protected, so that the user cannot have good user experience.

SUMMARY OF THE INVENTION

Embodiments of the present disclosure provides a method, an electronic device, and a computer program product for backing up data.

In a first aspect of the present disclosure, a method for backing up data is provided. The method includes: determining historical information of a storage space for backing up the data, the historical information indicating a historical size of the storage space configured to store the data within a historical time period, a size of the data being changeable within the historical time period; determining change information of the historical size of the storage space based on the historical information; determining, based on the change information, a probability that a size of the storage space to be configured to back up the data reaches a predetermined size; and adjusting, based on a determination that the probability is higher than or equal to a predetermined threshold, a backup policy for backing up the data to reduce the probability.

In a second aspect of the present disclosure, an electronic device is provided. The device includes: at least one processing unit; and at least one memory, the at least one memory being coupled to the at least one processing unit and storing instructions to be executed by the at least one processing unit, the instructions, when executed by the at least one processing unit, causing the device to execute an action, the action including: determining historical information of a storage space for backing up data, the historical information indicating a historical size of the storage space configured to store the data within a historical time period, a size of the data being changeable within the historical time period; determining change information of the historical size of the storage space based on the historical information; determining, based on the change information, a probability that a size of the storage space to be configured to back up the data reaches a predetermined size; and adjusting, based on a determination that the probability is higher than or equal to a predetermined threshold, a backup policy for backing up the data to reduce the probability.

In a third aspect of the present disclosure, a computer program product is provided. The computer program product is tangibly stored in a non-transitory computer-readable medium and includes machine-executable instructions. The machine-executable instructions, when executed, cause a machine to execute any step of the method according to the first aspect of the present disclosure.

The Summary of the Invention is provided to introduce a selection of concepts in a simplified form, which will be further described in the Detailed Description below. The Summary of the Invention is neither intended to identify key features or essential features of the present disclosure, nor intended to limit the scope of the embodiments of the present disclosure.

BRIEF DESCRIPTION OF THE DRAWINGS

The above and other objectives, features, and advantages of the present disclosure will become more apparent based on more detailed description of example embodiments of the present disclosure with reference to accompanying drawings. In the example embodiments of the present disclosure, the same reference numerals generally represent the same components.

The same or corresponding reference numerals in the accompanying drawings represent the same or corresponding components.

DETAILED DESCRIPTION

Figure 1:
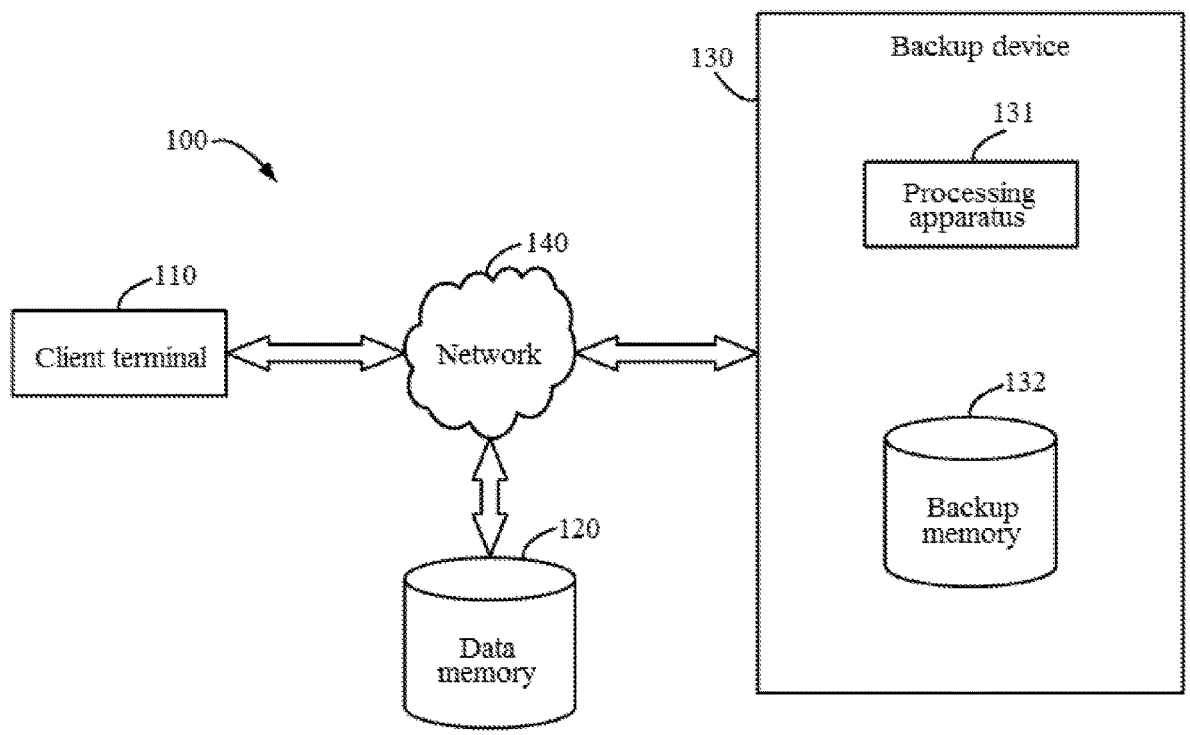
FIG. 1 shows a schematic diagram of data backup environment 100 in which a method for backing up data in some embodiments of the present disclosure may be implemented.

Preferred embodiments of the present disclosure will be described in more detail below with reference to the accompanying drawings. While the preferred embodiments of the present disclosure are shown in the accompanying drawings, it should be understood that the present disclosure can be implemented in various forms and should not be limited by the embodiments set forth herein. In contrast, these embodiments are provided to make the present disclosure more thorough and complete, and fully convey the scope of the present disclosure to those skilled in the art.

The term "including" and variants thereof used herein indicate open-ended inclusion, i.e., "including, but not limited to." Unless specifically stated otherwise, the term "or" indicates "and/or." The term "based on" indicates "based at least in part on." The terms "an example embodiment" and "an embodiment" indicate "at least one embodiment." The term "another embodiment" indicates "at least one additional embodiment." The terms "first," "second," and the like may refer to different or identical objects. Other explicit and implicit definitions may also be included below.

As described in the Background above, use of a conventional data protection product may cause failure to effectively protect user data, so that a user cannot obtain good user experience. The main reason lies in that the conventional data protection product may only give an alarm to the user when a storage space for backing up the user data is insufficient. The product can be reconfigured only based on a user response; otherwise, an original backup policy will still be executed.

For example, when the conventional data protection product is used, a backup system will allocate a storage space to the user in a backup memory, so as to be configured to store backup data generated by backing up the user data. Furthermore, the backup system will set a threshold of use of the storage space, e.g., 90% of a size of the storage space. In a normal or initial case, backup of the user data will not cause the use of the storage space to exceed the threshold. In this case, the backup system will back up the user data based on a storage policy determined by the user, and store the backup data in the storage space. The employed storage policy includes a recovery point objective (RPO) for the user data and retention time of the backup data generated for the user data. For example, the backup system can choose to back up the user data every few hours or days, and keep the generated backup data for days or even more than a year.

However, a size of the user data is changeable and may be increased dramatically due to addition of a new content. For example, the size of the user data is increased by 10%-20%. In this case, the backup of the user data based on the original backup policy will also cause a size of the backup data to be increased by 10%-20%, so that the use of the storage space is correspondingly increased by 10%-20%. It should be understood that the increase in the use of the storage space gradually appears with an increase in backup data generated each time, and therefore the increase in the use of the storage space is actually a process. In this increase process, a use ratio of the storage space may be caused to approach a preset threshold, exceed this threshold, and eventually reach an upper limit of the size of the storage space.

The conventional data protection product can give an alarm to the user only when the use ratio of the storage space reaches the preset threshold, and wait for an instruction from the user to reconfigure the backup policy or, e.g., to add a new storage space by purchase. Therefore, when the user does not respond in time, the conventional data protection product fails to avoid a further increase in the use of the storage space. When the use of the storage space reaches the upper limit of the size of the storage space, a backup error will be caused by failure to further accommodate newly generated backup data in the storage space. In this case, the data protection product cannot normally provide protection for the user data.

Therefore, various problems may exist when the conventional data protection product is used. First of all, the user usually needs to pre-apply for a relatively large storage space, to avoid a backup failure caused by an increase in the user data, thereby resulting in a waste of the storage space. Furthermore, if the user does not pre-apply for the relatively large storage space, then the backup failure is very likely to be caused by the increase in the user data during data protection, thereby failing to obtain corresponding data protection. Moreover, a current setting of the threshold of the use of the storage space will bring great inconveniences to the user. If a very small threshold is set, then the user is very likely to receive an alarm frequently; and if a very large threshold is set, then the backup failure is very likely to be caused by the user's failure to respond in time. Therefore, the conventional data protection product cannot bring good user experience.

In order to at least partially solve the above problems and one or more of other potential problems, an embodiment of the present disclosure presents a new method for backing up data. According to this new method for backing up data, a backup system will monitor a use trend of a storage space in a backup memory, and determine, based on the use trend, whether a use of the storage space will exceed a threshold. When determining that the use of the storage space will very likely exceed the threshold, the backup system may automatically adjust a current backup policy to prevent the use of the storage space from exceeding the threshold, whilst giving an alarm to a user as a prompt. Then, after the user chooses to increase a size of the storage space, the backup system may further automatically recover an original backup policy. The user can be provided with better experience with this new method for backing up data.

FIG. 1 shows a schematic diagram of data backup environment 100 in which a method for backing up data in some embodiments of the present disclosure may be implemented. Data backup environment 100 includes client terminal 110, data memory 120, backup device 130, and network 140. Backup device 130 includes processing apparatus 131 and backup memory 132. It should be noted that data backup environment 100 is merely illustrative, rather than limiting, and is extensible that data backup environment 100 may include more client terminals and data memories, and even may further include more backup devices. In addition, the backup device may also include more processing apparatuses and backup memories, so as to meet the needs of more users for performing data backup simultaneously.

In data backup environment 100, a user uses client terminal 110 to manage, via network 140, stored user data stored in data memory 120, and interacts with backup device 130 via network 140. Processing apparatus 131 in backup device 130 is configured to perform various operations associated with data backup, including acquiring, via network 140, the user data stored in data memory 120, backing up the user data, and allocating a storage space in backup memory 132 to store the generated backup data. It should be noted that data memory 120 may also be local with respect to client terminal 110, so that client terminal 110 can directly access data memory 120 locally (not via network 140).

As described above, in the embodiments of the present disclosure, backup device 130 will monitor a use situation of the storage space allocated for the user data in backup memory 132 and perform corresponding processing, thereby implementing a data protection method in the embodiments of the present disclosure.

Figure 2:
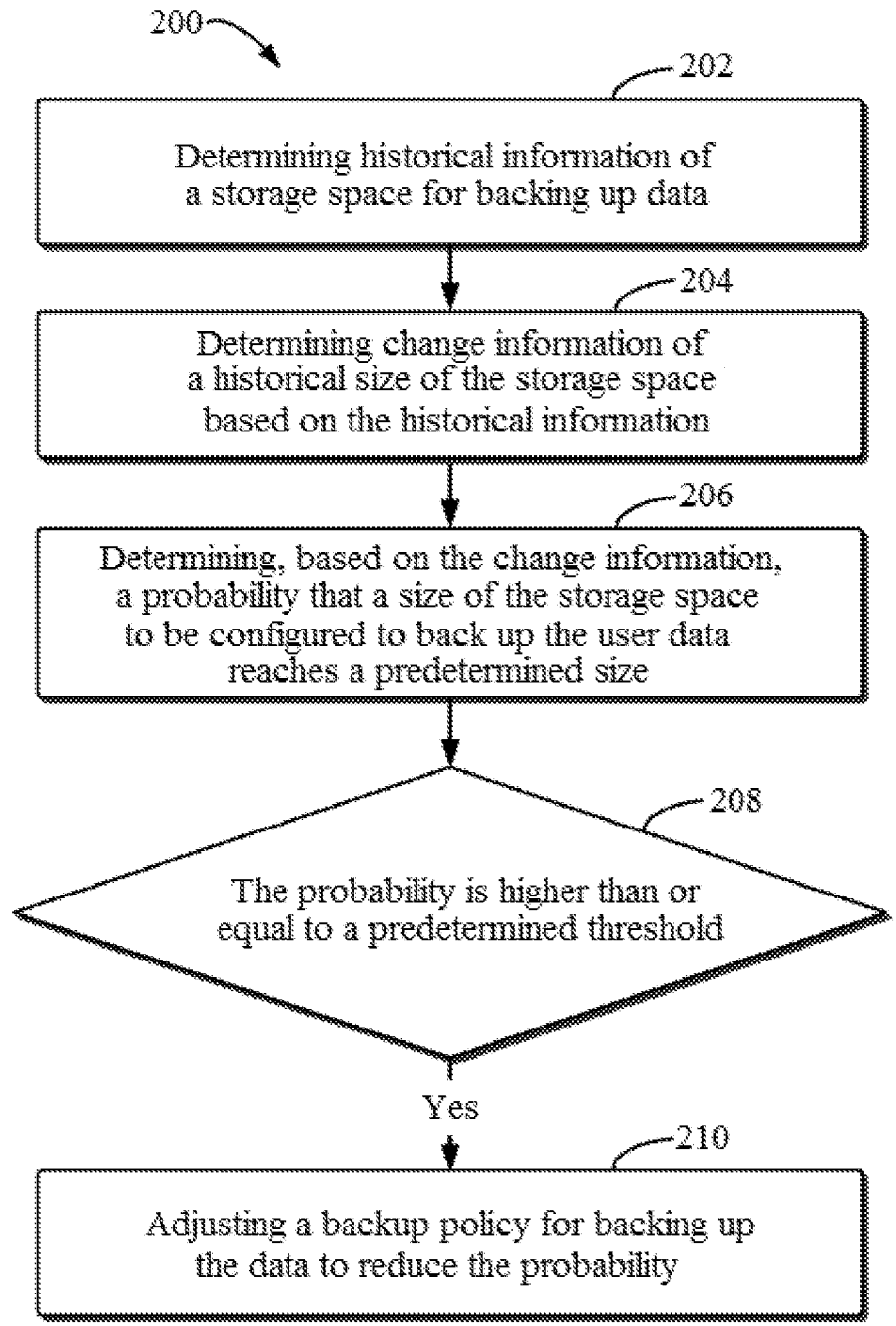
FIG. 2 shows a flowchart of method 300 for backing up data according to an embodiment of the present disclosure.

FIG. 2 shows a flowchart of method 200 for backing up data according to an embodiment of the present disclosure. Method 200 for backing up data may be implemented in data backup environment 100. It should be understood that method 200 for backing up data may further include additional steps that are not shown and/or may omit steps that are shown. The scope of the embodiment of the present disclosure is not limited in this respect.

In block 202, backup device 130 determines historical information of a storage space for backing up user data in backup memory 132. According to the embodiment of the present disclosure, the historical information indicates a historical size of the storage space configured to store the user data within a historical time period. As described above, a size of the user data is changeable within the historical time period. The step in block 202 may include backup device 130 continuously monitoring a use situation of the storage space for backing up the user data in backup memory 132 from a monitoring start time point. The monitoring start time point may be a time point of initially starting backup of the user data or a time point thereafter. The historical information in the step in block 202 may include the use situation of the storage space within a time period from the monitoring start time point to a current time point.

According to the embodiment of the present disclosure, before backup device 130 starts backup of the user data, backup device 130 may receive a request inputted by a user from client terminal 110, determine a backup policy to be adopted for the user data and a size of the storage space based on the request, and back up the user data for protection based on the backup policy. To facilitate the user to conveniently send a request indicating the backup policy and the size of the storage space, client terminal 110 may support the user to select a pre-configured request content in the form of a drop-down menu, so that the user can point out a desired backup policy and the size of the storage space more easily through the request. According to some other embodiments of the present disclosure, backup device 130 may acquire the backup policy directly from client terminal 110 based on properties of client terminal 110. The properties of client terminal 110 may indicate whether client terminal 110 belongs to a specific industry or is subject to specific policy requirements. Furthermore, according to still some other embodiments of the present disclosure, backup device 130 may also determine the size of the storage space on the basis of a preset rule or historical experience, or by machine learning, and based on the backup policy pointed out in the request outputted by the user through client terminal 110.

In block 204, backup device 130 determines change information of a historical size of the storage space based on the historical information. According to the embodiment of the present disclosure, the historical information indicates the historical size of the storage space configured to store the user data within a historical time period, and therefore, the change information of the historical size of the storage space can be determined based on the historical information. The change information may indicate a use trend of the storage space. In some embodiments, the change information may indicate that the historical size of the storage space does not change greatly. Additionally or alternatively, in some embodiments, the change information may indicate that the historical size of the storage space tends to be decreased, which reflects a decrease of the user data. Additionally or alternatively, in some other embodiments, the change information may indicate that the historical size of the storage space tends to be increased, which reflects an increase of the user data. According to some other embodiments of the present disclosure, the change information may indicate a change curve of the historical size of the storage space configured to store the user data over time within the historical time period, where a change trend of use of the storage space can be visually displayed by fluctuation of the curve or a change slope derived from the curve.

In block 206, backup device 130 determines, based on the change information determined in block 204, a probability that a size of the storage space to be configured to back up the user data reaches a predetermined size. According to the embodiment of the present disclosure, as described above, the change information may indicate the use trend of the storage space, and may be embodied as the change curve of the historical size of the storage space over time or the change slope derived from the curve. Therefore, backup device 130 may determine the probability that the size of the storage space to be configured to back up the user data reaches the predetermined size based on the change information, where the predetermined size is preset to be less than or equal to a value of a size of a storage space allocated for the user data in backup memory 132, e.g., may be 90% of the size of the allocated storage space.

According to some embodiments of the present disclosure, when the change information indicates that the use trend of the storage space is continuously increased, backup device 130 can determine that the size of the storage space to be configured to back up the user data will be bound to reach the predetermined size at some time in the future. According to some embodiments of the present disclosure, when the change information indicates that the use trend of the storage space fluctuates greatly, backup device 130 can determine the probability that the size of the storage space to be configured to back up the user data will reach the predetermined size at some time in the future based on a fluctuation curve. It should be understood that when backup device 130 determines that the size of the storage space to be configured to back up the user data will be bound to reach the predetermined size at some time in the future, backup device 130 can determine the probability that the size of the storage space to be configured to back up the user data will reach the predetermined size at some time in the future as 100%.

In block 208, backup device 130 determines whether the probability determined in block 206 is higher than or equal to a predetermined threshold. According to the embodiment of the present disclosure, the predetermined threshold may be any value from 50% to 100%, so that the probability being higher than or equal to the threshold indicates that the size of the storage space to be configured to back up the user data will reach the predetermined size with a relatively high probability. When backup device 130 determines that the probability determined in block 206 is lower than the predetermined threshold, backup device 130 performs no operations. When backup device 130 determines that the probability determined in block 206 is higher than or equal to the predetermined threshold, method 200 proceeds forward to block 210 to perform further operations.

In block 210, backup device 130 adjusts a backup policy for backing up the user data, so as to reduce the probability that the size of the storage space to be configured to back up the user data reaches the predetermined size. According to the embodiment of the present disclosure, method 200 is provided to prevent the size of backup data generated when the user data is backed up from reaching an upper limit of the size of the storage space allocated for the user data in backup memory 132. Therefore, when determining in block 208 that the size of the backup data will reach the predetermined size or the upper limit of the size of the storage space, backup device 130 will adjust the backup policy to reduce this probability. Therefore, the predetermined size may refer to a level of risk. When determining that the size of the backup data reaches this level of risk, then the size of the backup data tends to reach the upper limit of the size of the storage space.

According to the embodiment of the present disclosure, backup device 130 may adjust the backup policy in many ways. In some embodiments, backup device 130 may reduce a backup frequency for backing up the user data, which is equivalent to increasing the value of the recovery point objective. Additionally or alternatively, in some embodiments, backup device 130 may reduce backup retention time for backing up the user data, which is equivalent to reducing retention time of the generated backup data in backup memory 132.

It can be understood that the amount of to-be-generated backup data can be reduced immediately by reducing the backup frequency for backing up the user data, so that the probability that the size of the storage space to be configured to back up the user data reaches the predetermined size can be reduced rapidly.

When the backup retention time for backing up the user data is reduced, the backup retention time of backup data generated by backing up the user data within the historical time period can be reduced. In this case, eliminating the backup data stored in backup memory 132 can be accelerated, so that the probability that the size of the storage space to be configured to back up the user data reaches the predetermined size can also be reduced rapidly.

Alternatively or additionally, the backup retention time for backing up the user data can also be reduced by reducing the backup retention time of backup data to be generated by backing up the user data after the historical time period. In this case, it takes a relatively long time to reduce the above probability because the retention time of the newly generated backup data is to be reduced.

It should be understood that when a backup policy of reducing the backup retention time of the backup data generated by backing up the user data within the historical time period is selected, immediately deleting some backup data with expired retention time in accordance with the adjusted backup policy may be involved. According to the embodiment of the present disclosure, in order to better provide the user with data protection, the expired backup data may not be deleted completely, but one or more pieces of backup data among the earliest generated backup data and the latest generated backup data are chosen to be deleted, or some backup data is deleted based on time sequence at intervals, so that the user may have more recovery options when data recovery is required.

According to some embodiments of the present disclosure, backup device 130 may adjust the backup policy in accordance with an instruction in a request sent by the user through client terminal 110, where the request indicates an adjusted backup policy acceptable to the user.

According to some other embodiments of the present disclosure, backup device 130 may select how to adjust the backup policy, for example, which backup policy is used and whether to use a plurality of backup policies simultaneously, based on the probability that the size of the storage space to be configured to back up the user data reaches the predetermined size determined in block 206 and estimated time of reaching the predetermined size. When the probability that the size of the storage space to be configured to back up the user data reaches the predetermined size determined in block 206 is relatively low or the estimated time of reaching the predetermined size is relatively long, the backup policy of reducing the backup retention time of the backup data to be generated by backing up the user data after the historical time period may be adopted. When the probability that the size of the storage space to be configured to back up the user data reaches the predetermined size determined in block 206 is relatively high or the estimated time of reaching the predetermined size is relatively short, either a backup policy of reducing the backup frequency for backing up the user data or the backup policy of reducing the backup retention time of the backup data generated by backing up the user data within the historical time period may be adopted, or the two backup policies may be adopted simultaneously.

Figure 3:
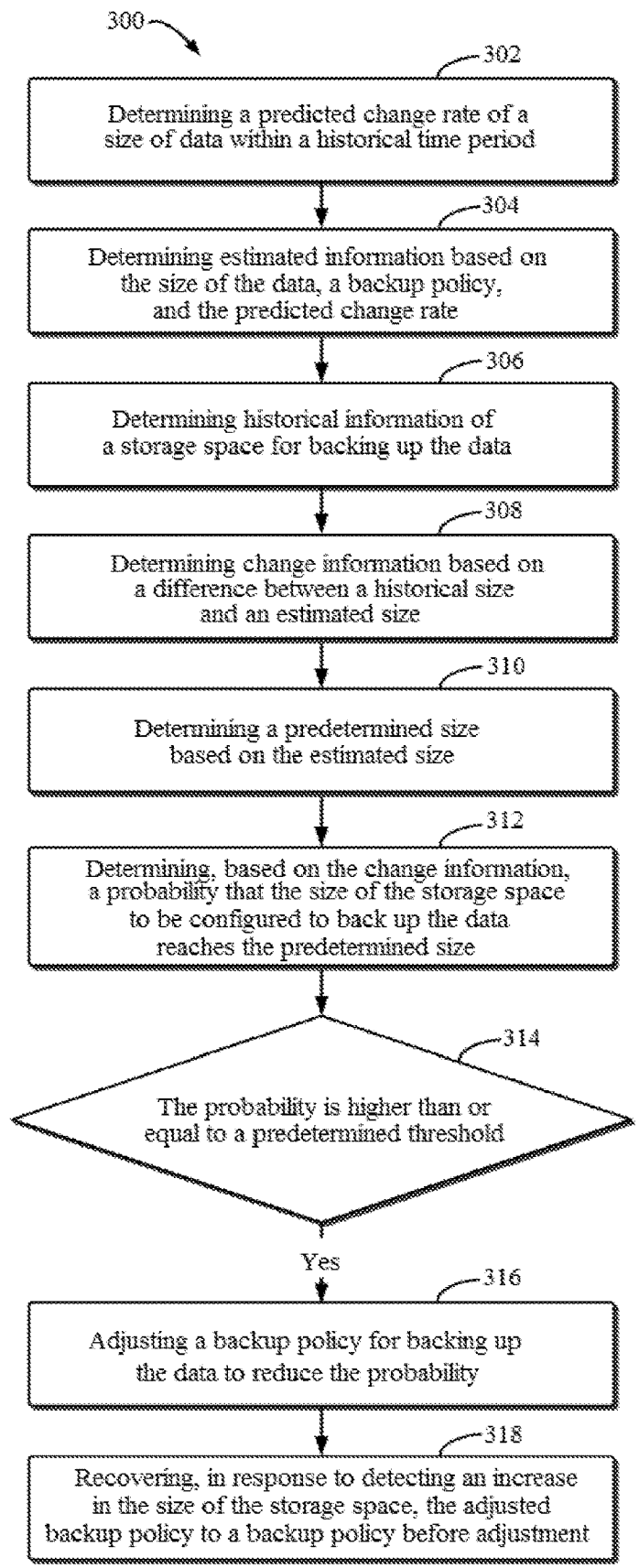
FIG. 3 shows a flowchart of method 400 for backing up data according to an embodiment of the present disclosure.

FIG. 3 is a flowchart of method 300 for backing up data according to an embodiment of the present disclosure. Method 300 for backing up data may also be implemented in data backup environment 100. It should be understood that method 300 for backing up data may also include additional steps that are not shown and/or may omit steps that are shown, and the scope of the present disclosure is not limited in this respect. Method 300 for backing up data is a specific implementation of method 200 for backing up data.

In block 302, backup device 130 determines a predicted change rate of the size of user data to be backed up within a historical time period. According to the embodiment of the present disclosure, the historical time period refers to a time period from a monitoring start time point to a time point in the future. According to some embodiments of the present disclosure, backup device 130 may receive a request inputted by a user from client terminal 110 before starting backup of the user data. The request may indicate a rangeability, a change frequency, and other information of the user data pointed out by the user, so that backup device 130 can determine the above predicted change rate based on this request. According to some other embodiments of the present disclosure, backup device 130 can determine the above predicted change rate based on properties of the user data. For example, when the user data involves regularly collecting a given type of data and then deleting the given type of data after a certain time period, backup device 130 can determine the above predicted change rate in accordance with this rule.

In block 304, backup device 130 determines estimated information based on the size of the user data to be backed up, a backup policy for backing up the user data, and the predicted change rate determined in block 302, where the estimated information indicates an estimated size of the storage space configured to back up the user data within the historical time period. It should be understood that due to introduction of a concept of the predicted change rate, the estimated information determined by backup device 130 indicates an estimated size, which is configured to store the user data and changes over time, of the storage space for backing up the user data within the historical time period.

In block 306, backup device 130 determines historical information of the storage space for backing up the user data in backup memory 132, where the historical information indicates a historical size of the storage space configured to store the user data within the historical time period. Specific contents of this step are the same as those of the step depicted in block 202. The description is not repeated here.

In block 308, backup device 130 determines change information based on a difference between the historical size and the estimated size. According to the embodiment of the present disclosure, both the historical size and the estimated size are sizes changing over time within the historical time period, and therefore correspond to two curves respectively. The estimated size may fluctuate, so the historical size may also fluctuate. Therefore, an increase of the historical size in a time period may be normal, and will not cause a size of a backup space configured to store the backup data to reach an upper limit of the size of the storage space. In this case, the difference between the historical size and the estimated size within the historical time period may be determined to determine an extent of the historical size actually deviating from the estimated size. The extent is indicated by the change information.

According to some embodiments of the present disclosure, a change curve of the difference between the historical size and the estimated size over time within the historical time period may be determined to determine the above change information, where a curve fluctuation or a change slope derived from the curve can intuitively display a change trend of use of the storage space.

According to some other embodiments of the present disclosure, the above change information can be determined by calculating an area between the curve corresponding to the historical size and the curve corresponding to the estimated size. It should be understood that the above area can be calculated by integration or simplified summation. The size of the storage space configured to store the backup data may be deleted due to expiration of retention time of previously generated backup data, and therefore, an increase in the area between the curve corresponding to the historical size and the curve corresponding to the estimated size may also indicate an increase in the change trend of the use of the storage space.

In block 310, backup device 130 determines the predetermined size referred to in block 206 based on the estimated size indicated by the estimated information determined in block 303. For example, when the estimated information indicates that a maximum value of the predetermined size for storing the backup data in the storage space is 1 TB, the estimated size may be determined as 1.2 TB. It should be understood that the above examples are merely illustrative rather than limiting, and the size of the data and/or the size of the storage space may also be other appropriate values.

In block 312, backup device 130 determines a probability that the size of the storage space to be configured to back up the user data reaches the predetermined size based on the change information determined in block 308. Specific contents of this step are the same as those of the step depicted in block 206. The description is not repeated here.

In block 314, backup device 130 determines whether the probability determined in block 312 is higher than or equal to a predetermined threshold. Specific contents of this step are the same as those of the step depicted in block 208. The description is not repeated here.

In block 316, backup device 130 adjusts a backup policy for backing up the user data to reduce the probability that the size of the storage space to be configured to back up the user data reaches the predetermined size. Specific contents of this step are the same as those of the step depicted in block 210. The description is not repeated here.

In block 318, backup device 130 recovers, in response to detecting an increase in the size of the storage space, the adjusted backup policy to a backup policy before adjustment. According to the embodiment of the present disclosure, backup device 130 can inform the user of adjusting the backup policy after adjusting the backup policy for backing up the user data. If the user considers the adjusted backup policy to be acceptable, the user does not need to perform any operation. Otherwise, the user can increase the size of the storage space by purchase or the like. According to the embodiment of the present disclosure, the increase in the size of the space may be default or determined by backup device 130 based on the change information determined in block 308. Therefore, when the increase in the size of the storage space is detected by backup device 130, the adjusted backup policy can be recovered to the backup policy before adjustment, so that a more preferred backup policy can be automatically and rapidly recovered to back up the user data.

Related contents of data backup environment 100 in which a method for backing up data in some embodiments of the present disclosure may be implemented, method 200 for backing up data according to an embodiment of the present disclosure, and method 300 for backing up data according to an embodiment of the present disclosure are described above with reference to FIG. 1 to FIG. 3. It should be understood that the above description is intended to better show the contents depicted in the embodiments of the present disclosure, rather than imposing any limitations.

It should be understood that the numbers of various elements and the magnitudes of the physical quantities used in the above accompanying drawings of the embodiments of the present disclosure are merely examples, rather than imposing limitations to the protection scope of the embodiments of the present disclosure. The above numbers and magnitudes may be arbitrarily set as required, and will not affect the normal implementation of the embodiments of the present disclosure.

Through the above description with reference to FIG. 1 to FIG. 3, the technical solution according to the embodiments of the present disclosure has many advantages with respect to the conventional solutions. For example, by using the technical solution, backup device 130 can determine a change trend of use of a storage space configured to back up data in backup memory 132 to pre-adjust a backup policy, unlike the conventional solution which can only give an alarm when the storage space is about to become insufficient, such that a data backup failure will not be caused by an insufficient storage space. Furthermore, by using the technical solution, backup device 130 can flexibly adjust the backup policy based on the change trend or a change speed of the use of the storage space, thereby rapidly or gently reducing the use of the storage space based on different policy adjustment solutions, so that more preferred protection can be provided for the user data within an allowable range even if the backup policy needs to be adjusted. In addition, by using the technical solution, backup device 130 can automatically recover the adjusted backup policy to an original backup policy when a size of the storage space for backing up the data in backup memory 132 is increased, thereby enabling rapid response and recovering to provide expected protection for the user data.

Figure 4:
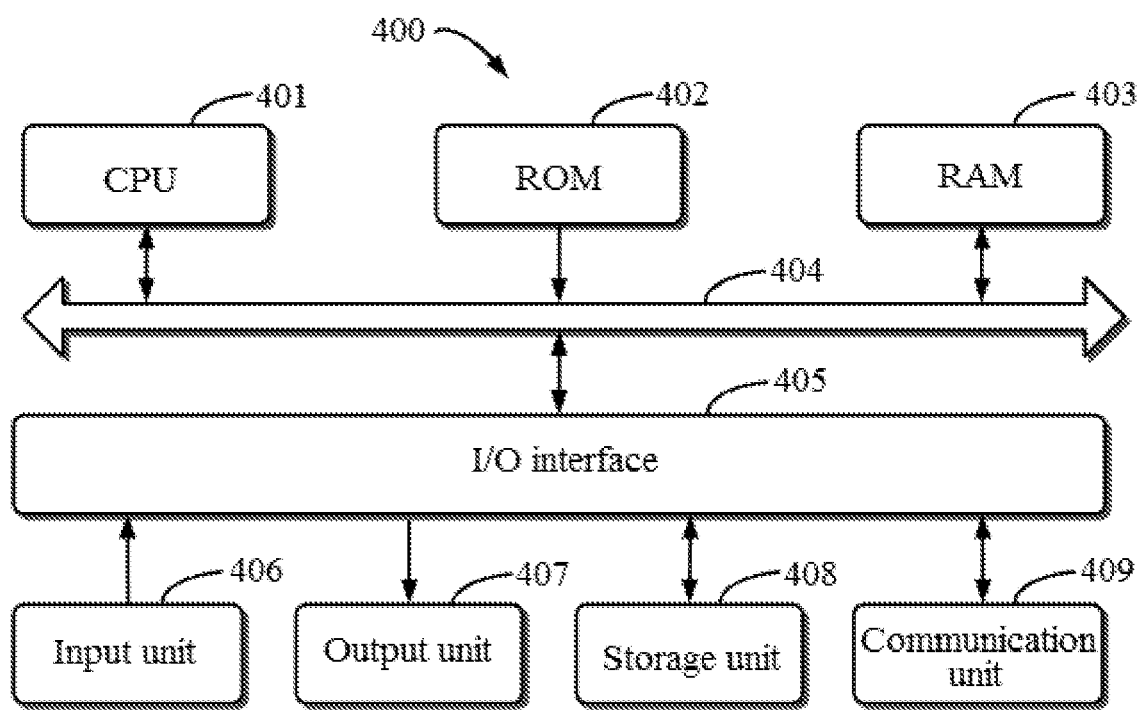
FIG. 4 shows a schematic block diagram of example device 400 that may be configured to implement an embodiment of the present disclosure.

FIG. 4 is a schematic block diagram of example device 400 that may be configured to implement an embodiment of the present disclosure. According to the embodiment of the present disclosure, backup device 130 shown in FIG. 1 may be implemented as example device 400. As shown in the figure, device 400 includes central processing unit (CPU) 401, which may execute various appropriate actions and processing in accordance with computer program instructions stored in read-only memory (ROM) 402 or computer program instructions loaded onto random access memory (RAM) 403 from storage unit 408. RAM 403 may further store various programs and data required for operations of device 400. CPU 401, ROM 402, and RAM 403 are connected to each other through bus 404. Input/output (I/O) interface 405 is also connected to bus 404.

A plurality of components in device 400 are connected to I/O interface 405, including: input unit 406, such as a keyboard and a mouse; output unit 407, such as various types of displays and speakers; storage unit 408, such as a magnetic disk and an optical disk; and communication unit 409, such as a network card, a modem, and a wireless communication transceiver. Communication unit 409 allows device 400 to exchange information/data with other devices via a computer network such as the Internet and/or various telecommunication networks.

The processes and processing described above, such as method 300 and method 400, may be executed by processing unit 401. For example, in some embodiments, method 300 and method 400 may be embodied as a computer software program that is tangibly included in a machine-readable medium, such as storage unit 408. In some embodiments, some or all of the computer program can be loaded and/or installed onto device 400 via ROM 402 and/or communication unit 409. When the computer program is loaded into RAM 403 and executed by CPU 401, one or more of the actions of method 300 and method 400 described above may be executed.

The embodiments of the present disclosure may relate to a method, a device, a system, and/or a computer program product. The computer program product may include a computer-readable storage medium with computer-readable program instructions for executing various aspects of the embodiments of the present disclosure loaded therein.

The computer-readable storage medium may be a tangible device that can retain and store instructions used by an instruction executing device. Examples of the computer-readable storage medium may include, but are not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device, such as a punch card or an in-groove raised structure with instructions stored thereon, and any suitable combination thereof. The computer-readable storage medium used herein is not construed as transient signals themselves, such as radio waves or other freely propagated electromagnetic waves, electromagnetic waves propagated through waveguides or other transmission media (e.g., optical pulses through fiber-optic cables), or electrical signals transmitted through electrical wires.

The computer-readable program instructions described here can be downloaded from a computer-readable storage medium to various computing/processing devices, or downloaded to an external computer or external storage device via a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions, such that the computer-readable program instructions are stored in the computer-readable storage medium in each computing/processing device.

The computer program instructions for performing the operations of the embodiments of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages such as Smalltalk and C++, and also include conventional procedural programming languages such as the "C" language or similar programming languages. The computer-readable program instructions may be executed completely on a user computer, partly on a user computer, as a separate software package, partly on a user computer and partly on a remote computer, or entirely on a remote computer or a server. In the case where a remote computer is involved, the remote computer can be connected to a user computer through any kind of network, including a local area network (LAN) or a wide area network (WAN), or can be connected to an external computer (e.g., connected through the Internet using an Internet service provider). In some embodiments, an electronic circuit, such as a programmable logic circuit, a field programmable gate array (FPGA), or a programmable logic array (PLA), may be customized by utilizing state information of the computer-readable program instructions. The computer-readable program instructions may be executed by the electronic circuit to implement various aspects of the embodiments of the present disclosure.

Various aspects of the embodiments of the present disclosure are described here with reference to flowcharts and/or block diagrams of the method, the device/system, and the computer program product according to the embodiments of the present disclosure. It should be understood that each block in the flowcharts and/or block diagrams as well as a combination of blocks in the flowcharts and/or block diagrams may be implemented by using the computer-readable program instructions.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause the computer, the programmable data processing apparatus, and/or another device to operate in a particular manner, such that the computer-readable medium storing the instructions includes a manufactured product, which includes instructions for implementing various aspects of the functions/actions specified in one or more blocks in the flowcharts and/or block diagrams.

The computer-readable program instructions may also be loaded onto a computer, another programmable data processing apparatus, or another device, such that a series of operation steps are performed on the computer, another programmable data processing apparatus, or another device to produce a computer-implemented process. Thus, the instructions executed on the computer, another programmable data processing apparatus, or another device implement the functions/actions specified in one or more blocks in the flowcharts and/or block diagrams.

The flowcharts and block diagrams in the accompanying drawings show architectures, functions, and operations of possible implementations of the system, the method, and the computer program product according to a plurality of embodiments of the present disclosure. In this regard, each block in the flowcharts or block diagrams may represent a module, a program segment, or part of an instruction, said module, program segment, or part of an instruction including one or more executable instructions for implementing specified logical functions. In some alternative implementations, the functions denoted in the blocks may occur in a sequence different from that shown in the figures. For example, any two blocks presented in succession may actually be executed substantially in parallel, or they may sometimes be executed in a reverse sequence, depending on the functions involved. It should be further noted that each block in the block diagrams and/or flowcharts as well as a combination of blocks in the block diagrams and/or flowcharts may be implemented by using a dedicated hardware-based system executing specified functions or actions, or by a combination of dedicated hardware and computer instructions.

The embodiments of the present disclosure have been described above. The above description is illustrative, rather than exhaustive, and is not limited to the disclosed embodiments. Numerous modifications and alterations are apparent to those of ordinary skills in the art without departing from the scope and spirit of various illustrated embodiments. The selection of terms used herein is intended to best explain the principles and practical applications of the embodiments or improvements of the technologies on the market, or to enable other persons of ordinary skills in the art to understand the embodiments disclosed herein.

The invention claimed is:

1. A method performed by a processor, for backing up data, comprising:
   determining, by a processor, historical information of a storage space for backing up the data, the historical information indicating a historical size of the storage space configured to store the data within a historical time period, a size of the data being changeable within the historical time period;
   determining, by a processor, change information of the historical size of the storage space based on the historical information;
   determining, by a processor, based on the change information, a probability that a size of the storage space to be configured to back up the data reaches a predetermined size; and automatically adjusting, by a processor, based on a determination that the probability is higher than or equal to a predetermined threshold, a backup policy for backing up the data to reduce the probability wherein adjusting the backup policy comprises at least one: reducing a backup frequency for backing up the data; or reducing backup retention time for backing up the data.

2. The method according to claim 1, wherein determining the change information comprises:
   acquiring pre-determined estimated information of the storage space for backing up the data, the estimated information indicating an estimated size of the storage space configured to store the data within the historical time period; and
   determining the change information based on a difference between the historical size and the estimated size.

3. The method according to claim 2, wherein acquiring the estimated information comprises:
   determining a predicted change rate of the size of the data within the historical time period; and
   determining the estimated information based on the size of the data, the backup policy, and the predicted change rate.

4. The method according to claim 1, further comprising:
   acquiring pre-determined estimated information of the storage space for backing up the data, the estimated information indicating an estimated size of the storage space configured to store the data within the historical time period; and
   determining the predetermined size based on the estimated size.

5. The method according to claim 1, wherein reducing the backup retention time comprises at least one of following items:
   reducing the backup retention time of backup data generated by backing up the data within the historical time period; or
   reducing the backup retention time of backup data to be generated by backing up the data after the historical time period.

6. The method according to claim 1, further comprising:
   recovering, in response to detecting an increase in the size of the storage space, the adjusted backup policy to a backup policy before adjustment.

7. An electronic device, comprising:
   at least one processing unit; and
   at least one memory, the at least one memory being coupled to the at least one processing unit and storing instructions configured to be executed by the at least one processing unit, the instructions, when executed by the at least one processing unit, causing the device to execute an action, the action comprising:
   determining historical information of a storage space for backing up data, the historical information indicating a historical size of the storage space configured to store the data within a historical time period, a size of the data being changeable within the historical time period;
   determining change information of the historical size of the storage space based on the historical information;
   determining, based on the change information, a probability that a size of the storage space to be configured to back up the data reaches a predetermined size; and
   automatically adjusting, based on a determination that the probability is higher than or equal to a predetermined threshold, a backup policy for backing up the data to reduce the probability wherein adjusting the backup policy comprises at least one: reducing a backup frequency for backing up the data; or reducing backup retention time for backing up the data.

8. The device according to claim 7, wherein determining the change information comprises:
   acquiring pre-determined estimated information of the storage space for backing up the data, the estimated information indicating an estimated size of the storage space configured to store the data within the historical time period; and
   determining the change information based on a difference between the historical size and the estimated size.

9. The device according to claim 8, wherein acquiring the estimated information comprises:
  determining a predicted change rate of the size of the data within the historical time period; and
  determining the estimated information based on the size of the data, the backup policy, and the predicted change rate.

10. The device according to claim 7, wherein the action further comprises:
  acquiring pre-determined estimated information of the storage space for backing up the data, the estimated information indicating an estimated size of the storage space configured to store the data within the historical time period; and
  determining the predetermined size based on the estimated size.

11. The device according to claim 7, wherein reducing the backup retention time comprises at least one of following items:
  reducing the backup retention time of backup data generated by backing up the data within the historical time period; or
  reducing the backup retention time of backup data to be generated by backing up the data after the historical time period.

12. The device according to claim 7, wherein the action further comprise:
  recovering, in response to detecting an increase in the size of the storage space, the adjusted backup policy to a backup policy before adjustment.

13. A computer program product, the computer program product being tangibly stored in a non-transitory computer-readable medium and comprising machine-executable instructions, the machine-executable instructions, when executed, causing a machine to perform operations, the operations comprising:
  determining historical information of a storage space for backing up data, the historical information indicating a historical size of the storage space configured to store the data within a historical time period, a size of the data being changeable within the historical time period;
  determining change information of the historical size of the storage space based on the historical information;
  determining, based on the change information, a probability that a size of the storage space to be configured to back up the data reaches a predetermined size;
  automatically adjusting, based on a determination that the probability is higher than or equal to a predetermined threshold, a backup policy for backing up the data to reduce the probability; and
  recovering, in response to detecting an increase in the size of the storage space, the adjusted backup policy to a backup policy before adjustment.

14. The computer program product according to claim 13, wherein determining the change information comprises:
  acquiring pre-determined estimated information of the storage space for backing up the data, the estimated information indicating an estimated size of the storage space configured to store the data within the historical time period; and
  determining the change information based on a difference between the historical size and the estimated size.

15. The computer program product according to claim 14, wherein acquiring the estimated information comprises:
  determining a predicted change rate of the size of the data within the historical time period; and
  determining the estimated information based on the size of the data, the backup policy, and the predicted change rate.

16. The computer program product according to claim 13, wherein the operations further comprise:
  acquiring pre-determined estimated information of the storage space for backing up the data, the estimated information indicating an estimated size of the storage space configured to store the data within the historical time period; and
  determining the predetermined size based on the estimated size.

17. The computer program product according to claim 13, wherein adjusting the backup policy comprises at least one of following items:
  reducing a backup frequency for backing up the data; or
  reducing backup retention time for backing up the data.

18. The computer program product according to claim 17, wherein reducing the backup retention time comprises at least one of following items:
  reducing the backup retention time of backup data generated by backing up the data within the historical time period; or
  reducing the backup retention time of backup data to be generated by backing up the data after the historical time period.

* * * * *